United States Patent [19]

Niejadlik

[11] 3,753,200
[45] Aug. 14, 1973

[54] SHORT CIRCUIT PROOF LEVEL SENSOR

[75] Inventor: John Niejadlik, Littleton, Mass.

[73] Assignee: Meritape, Inc., West Concorde, Mass.

[22] Filed: May 18, 1972

[21] Appl. No.: 254,484

[52] U.S. Cl. .................................. 338/42, 73/301
[51] Int. Cl. ............................................. G01f 23/18
[58] Field of Search .................... 73/301, 304 R; 340/244 R, 246; 200/190; 338/13, 42

[56] References Cited
UNITED STATES PATENTS

| | | | |
|---|---|---|---|
| 3,583,221 | 6/1971 | Ehrenfried et al. | 73/301 |
| 3,511,090 | 5/1970 | Ehrenfried et al. | 73/301 |
| 3,153,342 | 10/1964 | Pierce et al. | 73/301 |
| 2,930,232 | 3/1960 | Spears | 73/304 R |

FOREIGN PATENTS OR APPLICATIONS 716,958  10/1954  Great Britain .......................... 73/301

Primary Examiner—Richard C. Queisser
Assistant Examiner—Denis E. Corr
Attorney—Joseph Weingarten, Stanley M. Schurgin et al.

[57] ABSTRACT

An elongated continuous sensor adapted for disposition within a fluent material for monitoring the level thereof and operative even in the presence of a short circuit in the electrical winding of such sensor. A resistance winding helically wound around and insulated from a base strip includes portions confronting a surface having discrete conductive areas, each adjacent pair of areas being bridged by a respective turn of the helical winding. In the presence of surrounding pressure caused by the fluent material mass, the bridging turns within the material mass are deflected into engagement with the underlying conductive areas such that the discrete conductive areas within the material mass are effectively interconnected to short circuit that portion of the snesor submerged within the mass, the resistance of the helical winding above the material mass being a direct measure of material level. A short circuit of one or more adjacent turns of the helical winding to the underlying conductive areas causes the short circuiting of only those turns with the result that the sensor remains operative with only a slight error introduced by the number of turns short circuited.

7 Claims, 7 Drawing Figures

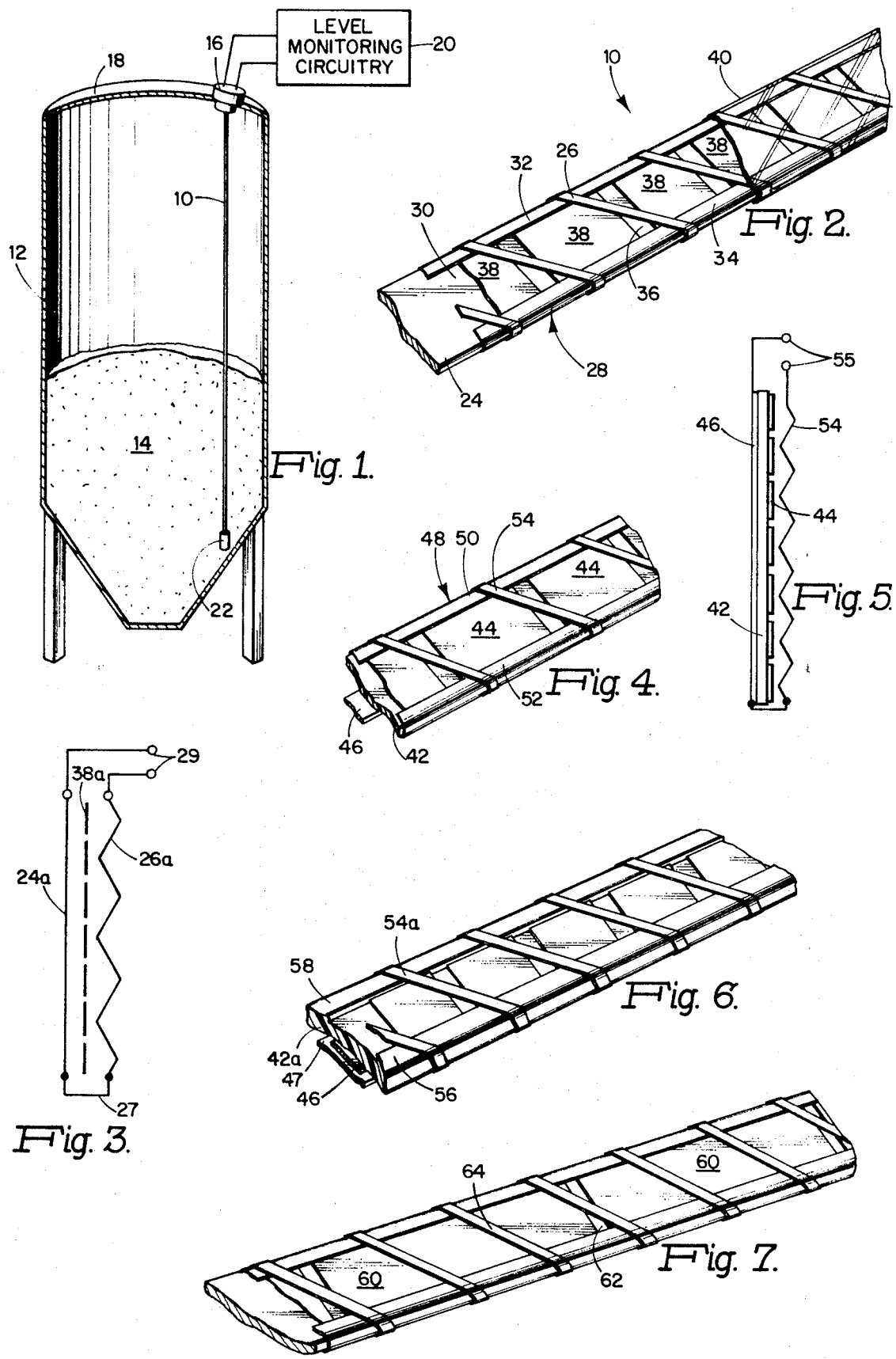

3,753,200

SHORT CIRCUIT PROOF LEVEL SENSOR

FIELD OF THE INVENTION

This invention relates to continuous level sensors and more particularly to an elongated continuous sensor of the level of fluent material.

BACKGROUND OF THE INVENTION

An elongated continuous sensor is shown in U.S. Pat. No. 3,153,342, assigned to the assignee of the present invention, which is highly effective for monitoring the level of fluent materials such as liquids, powders, dry bulk solids and the like. Such sensors sold under the trademark METRITAPE include an elongated conductive base strip having a resistance wire helically wound therearound and insulated therefrom with the exception of an exposed portion along one surface of the base strip. The turns of the helical winding are in the absence of surrounding pressure applied to the sensor by a material mass spaced from the underlying portions of the uninsulated base strip. The sensor is usually enclosed within a resilient jacket and is suspended within a storage vessel containing fluent material, the level of which is to be monitored. The conductive base strip and upper end of the helical winding are connected to suitable utilization circuitry for indicating material level or for providing control signals representative of material level and employed in automatic filling and draining systems.

The portion of the helical winding within a surrounding material mass is caused by the surrounding pressure of the mass to collapse or deform into engagement with the underlying base strip causing short circuiting of that portion of the helical winding within the material mass. The resistance of the portion of the helical winding outside of the material mass is varied in accordance with material level and is therefore a direct measure of such level. The METRITAPE sensor provides highly reliable and accurate operation even under severe operating conditions. However, under certain conditions, one or more turns of the helical winding can become short circuited to the underlying base strip such that the entire portion of the sensor below the short circuit is inoperative. Level measurement cannot be made below the short circuit point, and for material levels above the short circuit point, the level measurement can be subject to significant error by reason of the non-operative portion. A short circuit can be caused, for example, by deflection of the sensor beyond usual limits within a storage vessel caused by transverse movement of a material mass, or by deformation or bending of a helical turn into permanent engagement with the base strip.

SUMMARY OF THE INVENTION

In accordance with the present invention, an elongated continuous level sensor is provided wherein a short circuit in one or more adjacent turns of the helical winding does not materially affect sensor operation. Briefly, the sensor constructed according to the invention includes a resistance winding helically wound around an elongated base strip and having turns which confront a surface having discrete conductive areas or segments thereon, each adjacent pair of conductive areas being bridged by a respective winding turn. The respective ends of the resistance winding are connected to suitable utilization circuitry for providing an output indication of material level. In the absence of surrounding pressure the helical turns are spaced from the underlying conductive areas.

In the presence of surrounding pressure caused by the fluent material mass in which the sensor is disposed, the winding turns within the material mass are caused to deform into engagement with the underlying conductive areas to interconnect the conductive areas within the material mass and to short circuit the portion of the helical winding within the mass. The resistance of the portion of the helical winding above the level of the material varies in accordance with material level and is a direct measure of such level.

If a single winding turn engages the underlying conductive areas due to a spurious condition, such as the bending of a single winding turn, only the bridging portion of the turn engaging the conductive areas becomes short circuited. The resistance change caused by the short circuited bridging portion is usually negligible compared with overall sensor resistance, and there is no material affect on the operability or accuracy of the sensor. In the event that two or more adjacent winding turns become short circuited to the underlying conductive areas, the sensor still remains operational with only a small error introduced by the loss of the short circuited turns from the overall winding, which is usually of substantial length.

In a typical embodiment the resistance winding is helically wound around an electrically conductive base strip and is insulated therefrom by an interposed layer of insulative material having physically distinct conductive areas confronting respective turns of the helical winding. The lower end of the winding is connected to the conductive base strip which serves as one electrical lead for the sensor, the other lead connection being made to the upper end of the sensor winding. In another embodiment of the invention, the base strip is electrically insulative and includes physically distinct conductive areas on one surface thereof confronting the bridging turns of the helical winding, and a conductive path on the other surface of the base strip for connecting the lower end of the resistance winding to a device terminal.

DESCRIPTION OF THE DRAWINGS

The invention will be more fully understood from the following detailed description taken in conjunction with the accompanying drawings, in which:

FIG. 1 is a cut-away pictorial view of a level sensor according to the invention in a typical installation within a storage vessel;

FIG. 2 is a cut-away pictorial view of a level sensor constructed and operative according to the invention;

FIG. 3 is a schematic representation of a level sensor according to the invention;

FIG. 4 is a cut-away pictorial view of an alternative embodiment of the invention;

FIG. 5 is a schematic representation of the embodiment of FIG. 4;

FIG. 6 is a cut-away pictorial view of a further embodiment of the invention; and FIG. 7 is a cut-away pictorial view of yet another embodiment of the invention.

DETAILED DESCRIPTION OF THE INVENTION

Referring to FIG. 1, there is shown a level sensor according to the invention and disposed in a typical operating environment for monitoring fluent material level. The elongated level sensor 10 is disposed vertically within a storage vessel 12 containing a fluent material level 14, the sensor being suspended by a mounting 16 attached to the roof 18 of vessel 12. The upper end of sensor 10 is connected via interconnecting wires to level monitoring circuitry 20 which can include, for example, a level indicator and also may include control circuitry for automatic control of the draining and filling of vessel 12 in response to predetermined level indications. Upper and lower level limits can also be indicated by appropriate alarm indicators operative in response to certain level measurements. The sensor 10 is freely suspended within the storage vessel and its vertical disposition is usually aided by a weight 22 affixed to the lower end of the sensor. The sensor provides an output resistance which is a measure of the level of fluent material 14 and level measurement can be provided throughout the active length of the sensor.

The sensor 10 is itself depicted or shown in FIG. 2. An elongated electrically conductive base strip 24 has wound therearound a helical winding 26 of resistance wire. The winding is wound with a predetermined uniform pitch around the base strip 24 and is insulated therefrom by means of an interposed insulating layer 28 which insulates the base strip from the helical winding with the exception of an uninsulated portion 30 provided along one face of the base strip between shoulder portions 32 and 34 of insulating layer 28.

A strip 36 of insulating material is provided on the uninsulated portion of base strip 24 with the edges thereof disposed beneath the shoulder portions 32 and 34 of insulating layer 28. A plurality of discrete conductive areas 38 are provided in side by side spaced relationship on the surface of insulating strip 36 confronting the turns of helical winding 26. By action of the shoulder portions 32 an3 34, the turns of the helical winding confronting the conductive areas 38 are maintained in spaced apart relationship therewith in the absence of surrounding pressure of the fluent material mass in which the sensor is disposed for level measurement. Each turn of the helical winding 26 bridges an adjacent pair of conductive areas 38 such that upon deflection of a helical turn by action of surrounding pressure of a fluent material mass, the deflected turn will engage both adjacent conductive areas and interconnect these areas to form a conductive path therebetween.

A resilient jacket 40 is provided around the entire sensor structure to isolate the sensor from the working environment. The jacket, which may be formed of one or more layers of material suitable to a particular operating environment, extends along the full sensor length and is usually sealed at the lower end of the sensor and to which a weight can be attached to aid in vertical disposition of the sensor in a storage vessel. The conductive areas 38 are typically provided by deposition of a conductive material such as aluminum on an insulative strip such as Mylar. The opposite surface of the insulating strip 36 can have an adhesive coating thereon for adherence of the strip to the confronting surface of the base strip 24.

The sensor is depicted in schematic representation in FIG. 3 which shows the conductive base strip 24a insulated from the conductive discrete areas 38a which, in turn, are spaced from the helical winding 26a. The lower end of winding 26a is electrically connected to base strip 24a such as by an interconnecting wire 27, and device terminals 29 are connected to the base strip and to the upper end of winding 26a. In the absence of any surrounding fluent material, the entire winding 26a remains spaced from the conductive areas 38a such that the resistance of the entire sensor winding serves as an indication of a zero level condition. With fluent materials surrounding a portion of the sensor, a portion of winding 26a within the material mass is collapsed into engagement with the confronting conductive areas 38a and effectively short circuiting the portion of the winding within the material mass. The output resistance of the winding portion above the level of the fluent material is then a measure of material level. Each adjacent pair of conductive areas 38a is interconnected by the bridging turn of winding 26a and is effectively short circuited by this interconnecting winding since the resistance value of a single interconnecting winding section is negligible for the short piece of wire involved.

An alternative embodiment of the invention is depicted pictorially in FIG. 4 and schematically in FIG. 5, wherein the base strip 42 is of electrically insulative material having formed on one surface thereof a plurality of distinct conductive areas 44 spaced one from the other and typically formed by well known film deposition techniques. A conductive path 46, also typically formed by film deposition, is provided on the opposite surface of base strip 42 and extending along the full length of the base strip. An insulating layer 48 is provided around the base strip forming shoulder portions 50 and 52 along the edges of the surface containing conductive areas 44. A resistance winding 54 is helically wound around the base strip with each helical turn bridging an adjacent pair of conductive areas 44. The shoulder portions 50 and 52 serve, as described above, to maintain the confronting helical turns of winding 54 in spaced relationship from the underlying conductive areas in the absence of surrounding pressure from a fluent material. A jacket can be provided around the sensor as described above in connection with the embodiment of FIG. 2. The lower end of winding 54 is connected to the conductive path 46 which serves as a return path for connection to one sensor terminal, the other sensor terminal being connected to the upper end of winding 54. Operation of this embodiment is the same as that described hereinabove.

As a further alternative construction depicted in FIG. 6, the base strip 42a can itself be formed with raised shoulder portions 56 and 58, rather than employing an interposed insulating layer 48 as in FIG. 4, to maintain the spaced apart relationship of the briding helical turns of the resistance winding 54a. An insulating layer 47 serves to insulate conductor 46 from winding 54a.

It is a feature of the invention that a short circuit in one or more turns of the resistance winding do not affect operability of the overall sensor. The sensor in the presence of such a short circuit condition is still capable of providing an output indication of material level with no material error or with only a slight error caused by the short circuit. In the event that a single turn of the helical resistance winding is short circuited to the underlying conductive areas, only the portion of the short circuited turn which bridges the adjacent conductive areas is rendered inoperative, and the loss of this small segment of the resistance winding is usually negligible when compared with overall sensor resistance. Operability of the sensor is therefore not materially affected by the short circuiting of a single winding turn.

In the event that two or more adjacent turns of the helical winding become short circuited to the underlying conductive areas, the short circuited turns introduce a small error in the sensor output resistance, but this error is usually small in view of the rather extensive length of sensors employed in practical operating environments wherein sensor lengths of one hundred feet or more are typical.

Preferably the conductive areas or segments are each of a length equal to the pitch of the resistance winding such that each winding turn confronts a pair of adjacent segments, as illustrated. Alternatively, the conductive areas can be of longer length, as depicted in FIG. 7. Referring to FIG. 7, the sensor is shown to be generally similar to the embodiment of FIG. 2 except that the conductive areas 60 formed on insulating strip 62 confront several turns of helical winding 64. Adjacent conductive areas 60 are bridged by a turn of the conductive winding which serves to interconnect the adjacent conductive areas upon deformation of the helical winding caused by surrounding pressure of a fluent material mass. In the event that two or more short circuits occur in separated turns of resistance winding 64 which confront a single conductive area 60, an error would be introduced by reason of the loss of those turns of the sensor winding between the short circuited points. In the embodiments described above, the error introduced by the short circuiting of separated turns is smaller since each short circuited turn results in only the loss of the bridging portion of that turn. The embodiment of FIG. 7 is otherwise operable the same as the embodiments earlier described.

Various modifications and alternative implementations of the invention will now occur to those versed in the art without departing from the spirit and true scope of the invention. Accordingly, it is not intended to limit the invention by what has been particularly shown and described except as indicated in the appended claims.

What is claimed is:

1. A level sensor comprising:
   an elongated base strip;
   a plurality of discrete conductive areas insulatingly disposed on one surface thereof extending in spaced apart regular relationship along the length of said base strip;
   a resistance element helically wound around said base strip and having portions bridging the confronting ends of adjacent ones of said discrete conductive areas and spaced therefrom in the absence of surrounding pressure;
   means for electrically connecting one end of said resistance element to a first sensor therminal;
   means for electrically connecting the opposite end of said resistance element to a second sensor terminal; and
   a flexible jacket surrounding said base strip and said helical winding and being sensitive to surrounding pressure.

2. The level sensor according to claim 1 wherein said base strip is of electrically conductive material;
   and wherein said sensor further includes an insulative material partially surrounding said base strip to define an uninsulated opening along the length of one side of said base strip containing said discrete conductive areas, said helical element being insulated from said base strip by said interposed insulative material.

3. The level sensor according to claim 1 wherein said base strip is of electrically insulative material;
   and wherein said means for connecting one end of said resistance element to a first sensor terminal includes a conductive path provided on the surface of said base strip opposite to the surface containing said discrete conductive areas and extending substantially along the full length of said base strip.

4. The level sensor according to claim 1 wherein said base strip is of electrically insulative material and includes first and second raised portions extending along opposite edges of the surface of said base strip containing said discrete conductive areas, the portions of said resistance element bridging said confronting discrete conductive areas being spaced therefrom by said raised portions in the absence of surrounding pressure.

5. An elongated level sensor adapted for disposition within a fluent material mass and operative to provide an output indication continuously representative of the level of said material mass, said level sensor comprising:
   an elongated base strip;
   a resistance element helically wound around said base strip substantially along the full length thereof;
   a plurality of discrete conductive areas insulatingly disposed on a surface of said base strip in regular spaced apart relationship along the length thereof, each adjacent pair of conductive areas being bridged by a turn of said helical element;
   the turns of said helical element being spaced from said discrete conductive areas in the absence of surrounding pressure and being adapted to engage the underlying portions of said conductive areas in the presence of surrounding pressure caused by said fluent material mass;
   means for electrically connecting respective opposite ends of said resistance element to first and second sensor terminals; and
   a flexible jacket surrounding said base strip and said helical element and being sensitive to surrounding pressure.

6. A level sensor adapted for disposition in a fluent material mass and comprising:
   an electrically conductive base strip;
   an insulative material partially surrounding said base strip to define an uninsulated opening along the length of one side of said base strip;
   a plurality of discrete conductive areas disposed on and insulated from said uninsulated opening of said base strip;
   a resistance wire helically wound around said insulated base strip and having portions bridging confronting ends of adjacent ones of said conductive areas and spaced therefrom in the absence of surrounding pressure;
   a flexible jacket surrounding said base strip and said helical wire and being sensitive to surrounding pressure; and
   means connecting the lower end of said helical winding to said base strip;
   said base strip and the upper end of said helical wire being adapted for connection to level monitoring circuitry.

7. The level sensor according to claim 6 wherein said plurality of discrete conductive areas are contained on a strip of insulating material supported on said one side of said base strip, with said conductive areas in confronting relation to said bridging portions of said resistance wire.

* * * * *